United States Patent
Watanabe et al.

(10) Patent No.: US 7,054,634 B2
(45) Date of Patent: May 30, 2006

(54) MULTI-SERVICE RADIO COMMUNICATION SYSTEM

(75) Inventors: Yoneo Watanabe, Tokyo (JP); Koji Yamaoka, Tokyo (JP); Gang Wu, Tokyo (JP); Khaled Mahmud, Tokyo (JP); Masugi Inoue, Tokyo (JP); Takashi Sakakura, Tokyo (JP)

(73) Assignees: Hitachi Kokusai Electric, Inc., Tokyo (JP); National Institute of Information and Communications Technology Incorporated Administrative Agency, Tokyo (JP); Mitsubishi Denki kabushiki Kaisha, Tokyo (JP)

( * ) Notice: Subject to any disclaimer, the term of this patent is extended or adjusted under 35 U.S.C. 154(b) by 0 days.

(21) Appl. No.: 10/506,663

(22) PCT Filed: Mar. 4, 2003

(86) PCT No.: PCT/JP03/02471

§ 371 (c)(1),
(2), (4) Date: May 2, 2005

(87) PCT Pub. No.: WO03/075489

PCT Pub. Date: Sep. 12, 2003

(65) Prior Publication Data

US 2005/0239443 A1 Oct. 27, 2005

(30) Foreign Application Priority Data

Mar. 6, 2002 (JP) ............................. 2002-060859

(51) Int. Cl.
*H04Q 7/20* (2006.01)

(52) U.S. Cl. ................... 455/440; 455/443; 455/422.1; 370/328

(58) Field of Classification Search ............... 455/456, 455/436, 440, 443, 422.1; 370/328
See application file for complete search history.

(56) References Cited

U.S. PATENT DOCUMENTS

| | | |
|---|---|---|
| 2002/0034947 A1* | 3/2002 | Soliman ..................... 455/436 |
| 2002/0102992 A1* | 8/2002 | Koorapaty et al. ......... 455/456 |
| 2002/0107032 A1* | 8/2002 | Agness et al. .............. 455/456 |
| 2003/0129992 A1* | 7/2003 | Koorapaty et al. ......... 455/456 |

FOREIGN PATENT DOCUMENTS

| | | |
|---|---|---|
| JP | 5-91017 | 4/1993 |
| JP | 6-315005 | 11/1994 |
| JP | 11-4471 | 1/1999 |
| JP | 2001-119748 | 4/2001 |
| JP | 2002-44729 | 2/2002 |
| JP | 2002-199451 | 7/2002 |

\* cited by examiner

*Primary Examiner*—Sonny Trinh
*Assistant Examiner*—Phuoc Doan
(74) *Attorney, Agent, or Firm*—McGinn Ip Law Group, PLLC

(57) ABSTRACT

In a multiservice wireless communication system according to the present invention, a location manager 47 of a multi-service terminal 140 detects its own position with a GPS receiver interface 49. The location manager sends the detected positional information to a management server 110 via a common-signaling wireless network base station 100 in which respective multiple service zones serviced by multiple wireless systems overlap in a common-signaling wireless zone and acquires information on available wireless systems as a response to that. A network selecting section 44 selects a wireless system that most matches selecting conditions from the acquired available wireless systems and performs communication via the interfaces 40 and 41 that operate the selected wireless system.

4 Claims, 3 Drawing Sheets

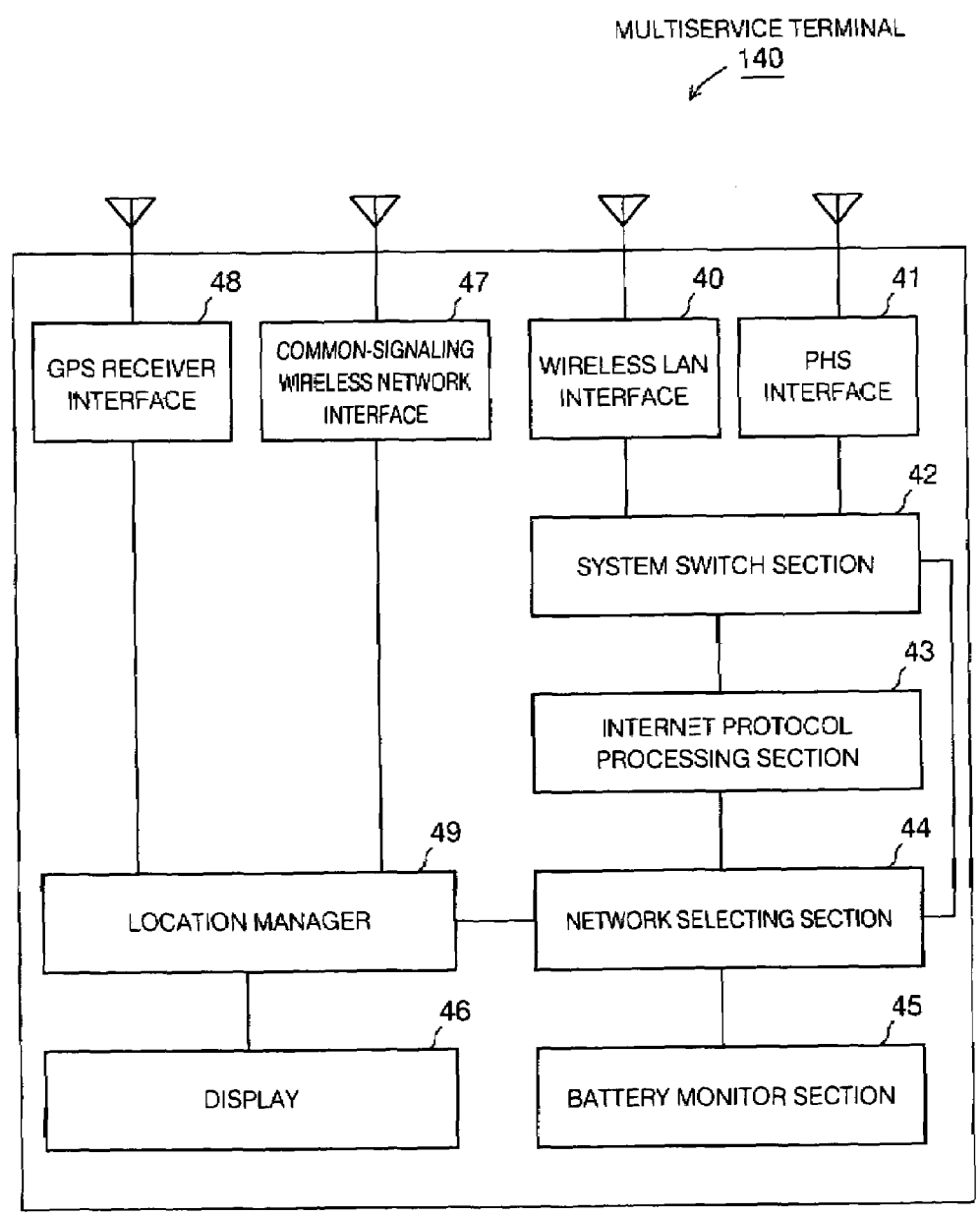

FIG. 3

|   | CONDITION | DESCRIPTION |
|---|---|---|
| 1 | COST | COMMUNICATION COST PER UNIT TIME |
| 2 | SPEED | TRANSMISSION RATE PER UNIT TIME |
| 3 | JOINTABILITY | WIRELESS SYSTEM WITH ROUGH TRACK |
| 4 | SUCCESSIVENESS | HIGH COVERAGE RATE OF SURROUNDING WIRELESS SYSTEMS |
| 5 | POWER CONSUMPTION | WIRELESS SYSTEM THAT ACHIEVES LOW-POWER TERMINAL |

FIG. 4

| WIRELESS SYSTEM NAME NM | COST CT | SPEED SP | JOINTABILITY JT | SUCCESSIVENESS SU | LOW POWER CONSUMPTION PW |
|---|---|---|---|---|---|
| PHS | | | | | |
| WIRELESS LAN | | | | | |
| ... | ... | ... | ... | ... | ... |

FIG. 5

| WIRELESS SYSTEM NAME | PRIORITY |
|---|---|
| PHS | 2 |
| WIRELESS LAN | 1 |

FIG. 6

| REMAINING BATTERY LIFETIME THRESHOLD | SELECTION PERMISSION SYSTEM |
|---|---|
| 60% | A, B, C, D |
| 40% | B, C, D |
| 30% | C, D |
| 20% | D |

MULTI-SERVICE RADIO COMMUNICATION SYSTEM

TECHNICAL FIELD

The present invention relates to a multiservice wireless communication system and, more particularly, to a multiservice wireless communication system in which the best available wireless service can be selected from multiple wireless systems.

BACKGROUND ART

Conventional techniques mentioned above include a multiservice wireless communication system that allows wireless communication service between PHSs and cellar telephones using multiservice terminals. It has however been difficult for the multiservice terminals to search for available wireless services on the basis of positional information of their own since the multiservice terminals use no common signaling wireless network for switching multiple wireless systems. In other words, in the multiservice terminals of the conventional multiservice wireless communication systems, in order to select the best available wireless service from multiple wireless systems, all the wireless systems must be searched to acquire information such as power level on reception.

In the foregoing conventional multiservice wireless communication systems, in order to select the best available wireless service from multiple wireless systems, all the wireless systems must be searched to acquire information such as power level on reception. Accordingly, when the number of wireless systems to be searched is large, a lot of time is required for searching. Also, the conventional systems do not have the function of switching wireless systems according to the application and policy that users use, the use position, and the use scene and also the function of switching wireless systems according to the remaining battery life.

The present invention has been made in view of the above problems. Accordingly, it is an object of the present invention to provide a multiservice wireless communication system in which there is no need to search all wireless systems to select the best available wireless service from multiple wireless systems, thus allowing the best wireless service to be selected in a short time, and with a short remaining battery life, a wireless service with low power consumption is selected from the available wireless systems to increase available wireless communication time.

DISCLOSURE OF THE INVENTION

In order to solve the above problems, the present invention provides a multiservice wireless communication system including a plurality of wireless systems, a common-signaling wireless network base station in which a plurality of service zones serviced by the plurality of wireless systems overlaps in a common-signaling wireless zone, a management server that stores information on respective available wireless systems in positions in the common-signaling wireless zone as database, a network connecting them, and a multiservice terminal serviced therefrom. The multiservice terminal includes a position detecting section for detecting its own position, an available-wireless-system-information acquisition section that transmits the position detected by the position detecting section to the management server via the common-signaling wireless network base station and acquires information on available wireless systems in the transmitted position from the database of the management server via the common-signaling wireless network base station, and a network selection switching section for selecting a wireless system that most matches selecting conditions from the available wireless systems acquired by the available-wireless-system-information acquisition section.

With such a constitution, the available-wireless-system-information acquisition section can acquire information on wireless systems available in the position where the multiservice terminal exists. The network selection switching section acquires information such as a reception power level only for the available wireless systems acquired by the available-wireless-system-information acquisition section to automatically select a wireless system that most matches selecting conditions in a short time.

According to an embodiment of the invention, the available-wireless-system-information acquisition section includes a GPS receiver interface for acquiring positional information via a GPS receiver, a location manager for receiving the positional information acquired by the GPS receiver interface, and a common-signaling wireless network interface for receiving the positional information received by the location manager, receiving information on available wireless systems that match the positional information from the management server via the common-signaling wireless network base station on the basis of the received positional information, and transferring it to the location manager. The network selection switching section includes a plurality of interfaces for communication with a plurality of wireless systems, a system switch section for selecting a reception power level of the available wireless systems which are detected by the interfaces, and a network selecting section for selecting a wireless system that most matches the selecting conditions including the reception power level received via the system switch section to enable communication via an internet protocol processing section, the system switch section, and an interface for operating the wireless system selected as most suitable one.

According to the invention, the wireless-system selecting conditions of the network selection switching section include the condition that the wireless system is selected only from wireless systems with low power consumption which match the remaining life of a battery mounted to the multiservice terminal. This allows available communication time to be extended with a low-power wireless system even with a weak battery.

According to the invention, the available-wireless-system-information acquisition section displays a list of the acquired available wireless systems on a display for a user to designate a desired wireless system; and the network selection switching section determines as to whether or not the designated wireless system matches the selecting conditions, wherein when the designated wireless system matches the selecting conditions, the wireless system is selected. This allows selection of a wireless system responsive to a user's demand in a short time.

BRIEF DESCRIPTION OF THE DRAWINGS

FIG. 2 is a block diagram for explaining the structure of a multiservice terminal used in the multiservice wireless communication system of FIG. 1.

FIG. 3 is a table of system switching conditions that are user profiles which are registered in advance and stored in the network selecting section of FIG. 2.

FIG. 4 is a list of available wireless systems that the network selecting section receives from a management server.

FIG. 5 is a table for explaining that the network selecting section determines the priority of a wireless system to be selected using the available wireless system list.

FIG. 6 is a table of limitations to wireless systems to be selected depending on their remaining battery life.

BEST MODE FOR CARRYING OUT THE INVENTION

Figure 1:
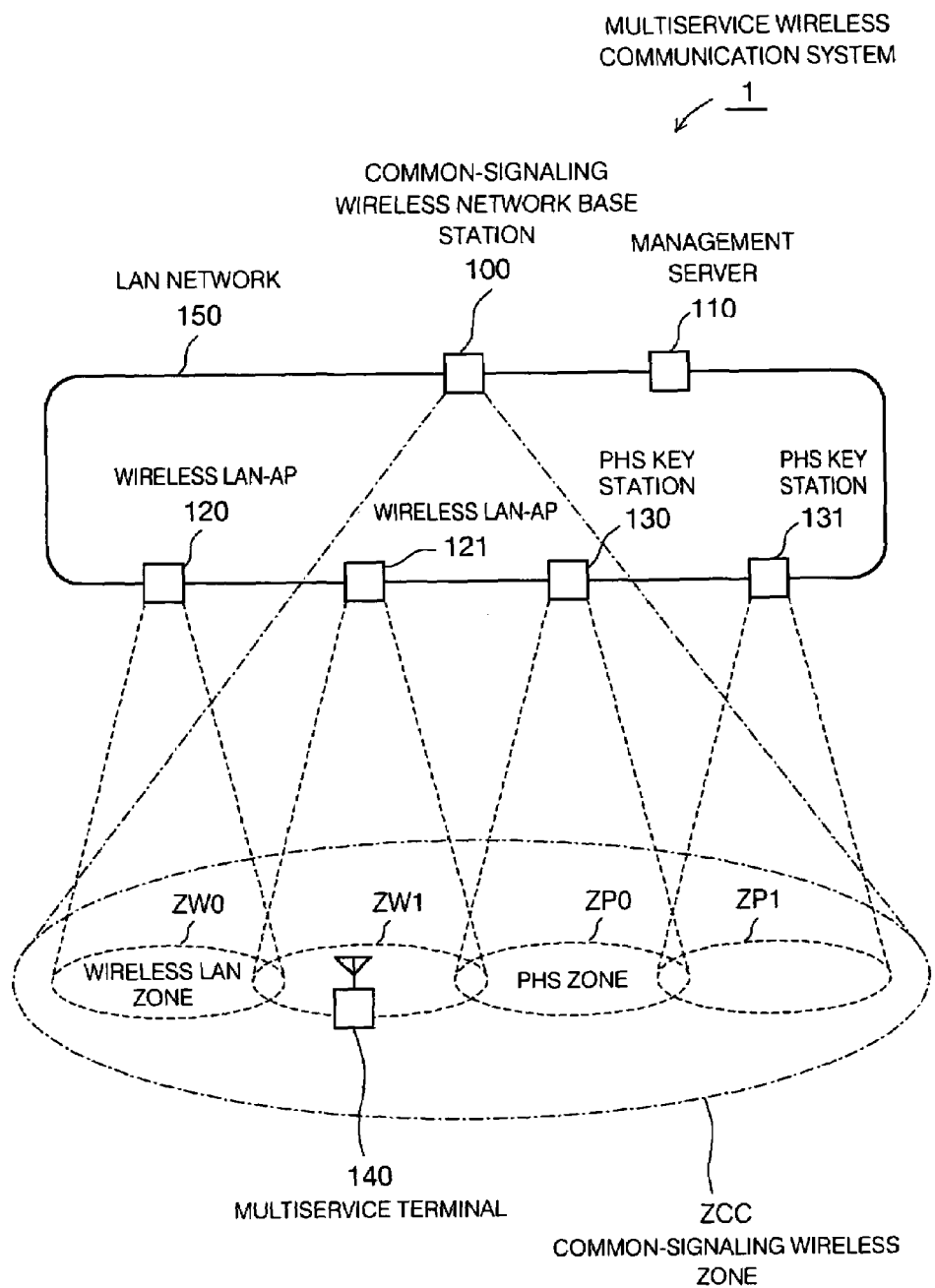
FIG. 1 is a block diagram of an embodiment of a multiservice wireless communication system according to the present invention.

An embodiment of the present invention will be described below with reference to the drawings. FIG. 1 is a block diagram of an embodiment of a multiservice wireless communication system according to the present invention; FIG. 2 is a block diagram for explaining the structure of a multiservice terminal used in the multiservice wireless communication system of FIG. 1; FIG. 3 is a table of system switching conditions that are user profiles which are registered in advance and stored in the network selecting section of FIG. 2; FIG. 4 is a list of available wireless systems that the network selecting section receives from a control server; FIG. 5 is a table for explaining that the network selecting section determines the priority of a wireless system to be selected using the available wireless system list; and FIG. 6 is a table of limitations to the range of wireless systems to be selected depending on their remaining battery life.

A multiservice wireless communication system 1 shown in FIG. 1 includes a common-signaling wireless network base station 100, a management server 110, wireless LAN-APs 120 and 121 (wireless LAN access points 120 and 121), PHS key stations 130 and 131, and a multiservice terminal 140 serving as a mobile terminal that receives service therefrom. They are connected, for example, via a LAN network 150. In a common-signaling wireless network wireless zone ZCC (hereinafter, referred to as a common-signaling wireless zone ZCC) that is the available service zone of a common-signaling wireless network serviced by the common-signaling wireless network base station 100, wireless LAN zones ZW0 and ZW1 to which the wireless LAN-APs 120 and 121 provides wireless LAN service and PHS zones ZP0 and ZP1 to which the PHS key stations 130 and 131 provide PHS service overlap with each other.

Also each of the wireless LAN zones ZW0 and ZW1 and the PHS zones ZP0 and ZP1 are partly or entirely overlap with each other, as shown in FIG. 1. The common-signaling wireless network base station 100 with such a structure sends and receives a common signal to and from all the multiservice terminals 140 of multiple wireless systems in the common-signaling wireless zone ZCC. The signal is exchanged with the management server 110 via the LAN network 150. For example, the common-signaling wireless network base station 100 mediates exchange of signals concerning an available wireless system list, to be described later, between the management server 110 and the multiservice terminals 140.

The management server 110 stores and manages information on wireless systems available to the multiservice terminal 140 as the database of the available wireless systems (see FIG. 4) in each position in the common-signaling wireless zone ZCC managed by the common-signaling wireless network base station 100. When positional information on the multiservice terminal 140 is given from the common-signaling wireless network base station 100 and information on available wireless systems corresponding to the positional information is required, the management server 110 registers the position of the multiservice terminal 140 on the basis of the positional information and sends information on the available wireless systems that match the positional information as an available wireless system list from the stored database to the multiservice terminal 140 via the common-signaling wireless network base station 100. The wireless LAN-APs 120 and 121 offer wireless LAN service to the multiservice terminal 140 in the wireless LAN zones ZW0 and ZW1. The PHS key stations 130 and 131 offer PHS service to the multiservice terminal 140 in the PHS zones ZP0 and ZP1.

The multiservice terminal 140 can selectively receive the service of various wireless systems in the common-signaling wireless zone ZCC. In that case, the multiservice terminal 140 exchanges a signal common to the multiple wireless systems with the common-signaling wireless network base station 100 and exchanges transmission data other than the common signal with the wireless LAN-APs 120 and 121 or the PHS key stations 130 and 131. For example, the multiservice terminal 140 detects its own position by GPS, registers its positional information to the management server 110 via the common-signaling wireless network base station 100, and receives a list of available wireless systems that match the positional information. The multiservice terminal 140 selects a wireless system most suitable to the present situation from the wireless systems (wireless LANs or PHSs in this embodiment) contained in the received available wireless system list, from which the multiservice terminal 140 receives service via the selected wireless LAN-APs 120 and 121 or the PHS key stations 130 and 131.

Referring now to FIG. 2, the structure of the multiservice terminal 140 will be specifically described. As shown in FIG. 2, the multiservice terminal 140 includes a wireless LAN interface 40, a PHS interface 41, a system switch section 42, an internet protocol processing section 43, a network selecting section 44, a battery monitor section 45, a display 46, a common-signaling wireless network interface 47, a GPS receiver interface 48, and a location manager 49.

The wireless LAN interface 40 includes a wireless LAN physical layer and a data link layer to make links to the wireless LAN-APs 120 and 121 for data communication. The PHS interface 41 includes a PHS physical layer and a data link layer to make links to the PHS key stations 130 and 131 for data communication. The system switch section 42 switches wireless systems having different physical layers and data link layers without causing awareness to a higher-level network layer. The internet protocol processing section 43 executes the protocol of a network layer and a transport layer used in the Internet.

The network selecting section 44 can be set to an automatic selection mode or a user-designation selection mode in this embodiment. With the automatic selection mode, the network selecting section 44 selects a wireless system to be used on the basis of an available wireless service list acquired by the location manager 49 from the management server 110 via the common-signaling wireless network interface 47, to be described later, the level of the reception power of the wireless system aquired by a lower-level wireless system interface (the wireless LAN interface 40 or the PHS interface 41 in this embodiment), and wireless-system selecting conditions designated by a user (under limitation by the battery monitor section 45, to be described later, the wireless system is selected within the limitation during calling, while the wireless system is switched to a wireless system within the limitation during communication). Thus, the service of the selected wireless system is offered via the wireless LAN interface 40 or the PHS interface 41 depending on the selection result.

With the user-designation selection mode, the network selecting section 44 displays the available wireless service list that the location manager 49 acquired from the management server 110 on the display 46 via the common-signaling wireless network interface 47 and waits for user selection. Upon user selection, the network selecting section 44 starts access to the selected wireless system. Specifically, it is determined for the selected wireless system as to whether or not the wireless system is available depending on the level of the reception power of the wireless system acquired by the lower-level wireless system interface and the wireless-system switching conditions designated by the user. When the wireless system is determined to be available as a result of the determination, the service of the wireless system is offered via the wireless LAN interface 40 or the PHS interface 41. On the other hand, when it is determined to be unavailable as a result of the determination, the determination is displayed on the display 46 and the network selecting section 44 requires to select the second best wireless system from the displayed available wireless service list and repeats the selecting operation.

The battery monitor section 45 monitors the remaining life of a battery (not shown) mounted to the multiservice terminal 140 and operates to limit the range of selection of the wireless system by the network selecting section 44 depending on the indication. The limitation allows the available communication time of the multiservice terminal 140 to be automatically extended. For example, suppose four wireless systems A, B, C, and D are available in the multiservice wireless communication system 1 of FIG. 1. The battery monitor section 45 monitors their remaining battery life all the time or intermittently, wherein when the remaining battery life is as much as 60% or more, the battery monitor section 45 designates all the wireless systems A, B, C, and D in accordance with the threshold shown in FIG. 6, as a selection permission system, posing no limitation to the selection of the wireless system by the network selecting section 44.

On the other hand, when the remaining battery life decreases to less than 60% and 40% or more, the battery monitor section 45 designates only the wireless systems B, C, and D except the wireless system A with the maximum power consumption, as a selection permission system, to limit the selection of the wireless system by the network selecting section 44. At that time, the network selecting section 44 cannot select the wireless system A even when the conditions other than the remaining battery life indicate that selection is permitted but can select a wireless system only from the wireless systems, B, C, and D. When the remaining battery life decreases to less than 40% and 30% or more, or less than 30% and 20% or more, the battery monitor section 45 designates the wireless systems C and D or the wireless system D, respectively, as a selection permission system, to limit the selection of the wireless system by the network selecting section 44. Of course, the operation of the battery monitor section 45 can be set not to operate selectively, if necessary, or alternatively, maybe set to ignore some threshold values.

The display 46 displays various required display contents, as described above. The common-signaling wireless network interface 47 exchanges a common signal concerning multiple wireless systems with the common-signaling wireless network base station 100. The GPS receiver interface 48 acquires positional information on the multiservice terminal 140 via a GPS receiver (not shown) provided to the multiservice terminal 140. The location manager 49 receives the positional information of its own acquired by the GPS receiver interface 48 and sends it to the management server 110 via a common-signaling wireless network operated by the common-signaling wireless network interface 47. In response to that, the location manager 49 receives an available wireless service list from the management server 110 and, for example, provides it to the network selecting section 44 or displays it on the display 46.

A series of operations of the multiservice terminal 140 will be described in sequence for during calling, communication, and reception under the condition that the remaining battery life is 60% or more and the network selecting section 44 is set to the automatic selection mode. During calling, the location manager 49 of the multiservice terminal 140 acquires positional information of its own from the GPS receiver interface 48 and sends it to the management server 110 via the common-signaling wireless network interface 47 and the common-signaling wireless network base station 100. The management server 110 which has received the positional information registers the position of the multiservice terminal 140 on the basis of the positional information and sends a list of available wireless systems that match the positional information to the location manager 49 of the multiservice terminal 140 via the common-signaling wireless network base station 100.

The available wireless system list in the above case is shown, for example, in FIG. 4. Specifically, the list contains information such as a wireless system name NM, cost CT, speed SP, jointability JN, successiveness SU, and power consumption PW. The wireless system name NM includes PHS and wireless LAN. The cost CT indicates the order of communication cost per unit time. The speed SP indicates data amount that can be transmitted per unit time. The jointability JT indicates the ease of joining (for example, the number of dead circuits of a wireless system with rough communication traffic). The successiveness SU indicates the rate of coverage of the surrounding wireless zone. The power consumption PW indicates power consumption per unit time.

The network selecting section 44 stores the system switching conditions that are a user profile registered in advance, as shown in FIG. 3. The network selecting section 44 receives the individual condition or a combination thereof and the available wireless system list acquired by the location manager 49 and determines the priority of wireless system selection, as shown in FIG. 5. The network selecting section 44 acquires the level of reception power of the wireless system in order of decreasing priority of the wireless system. When the acquired power level is a level that allows communication, data communication is started by the wireless system; when the acquired power level is a level that does not allow communication, the level of reception power of the second-priority wireless system is acquired similarly and it is determined as to whether or not communication is available. When the wireless system for communication is thus selected, an interface that operates the selected wireless system (the wireless LAN interface 40 or the PHS interface 41 in this embodiment) links to the selected wireless system in the level of the physical layer and the data link layer. The network selecting section 44 then transfers data to the available wireless systems, for example, to the system switch section 42 via the internet protocol processing section 43 to send the data to the interface that operates the selected wireless system and originates a call and comes into communication state.

The operation of the multiservice terminal 140 during communication, or the switching of wireless systems during communication will now be described. The location manager 49 regularly acquires positional information from the GPS receiver interface 48, wherein when a specified time or a specified distance advances, or when the reception power level of the wireless system selected by its own station decreases to create a need for switching, the location manager 49 sends new positional information to the management server 110, as in the same way as during calling, via the common-signaling wireless network interface 47. The management server 110 which has received the positional information updates the positional registration of the multiservice terminal 140, based on the positional information, and sends a list of available wireless systems that match the positional information to the multiservice terminal 140 via the common-signaling wireless network base station 100. The sent available wireless system list is received by the location manager 49.

The network selecting section 44 stores the system switching conditions that are a user profile registered in advance, as shown in FIG. 3. The network selecting section 44 receives the individual condition shown in FIG. 3 or a combination thereof and the available wireless system list acquired by the location manager 49 and determines the priority of wireless system selection, as shown in FIG. 5. The network selecting section 44 acquires the level of the reception power of the highest-priority wireless system from the system switch section 42. When the acquired reception power level is a level that allows communication, data communication is switched to that using the wireless system; when the reception power level is not a level that allows communication, the level of reception power of the second-priority wireless system is acquired and the operation similar to the above is repeated for the power level.

An interface that operates the selected wireless system (the wireless LAN interface 40 or the PHS interface 41 in this embodiment) links to the wireless system that is determined to be available in the level of the physical layer and the data link layer. The interface that was used for communication until a new link is established is disconnected at the level of the physical layer and the data link layer. In that case, the interface is switched according to new selection via a lower-level physical layer and data link layer while maintaining the communication in the processing section higher than the higher-level internet protocol processing section 43.

The network selecting section 44 then transfers data to the available wireless systems, for example, to the system switch section 42 via the internet protocol processing section 43 (a protocol processing section in another network layer or transport layer is possible). The data is sent to a newly selected interface (the wireless LAN interface 40 or the PHS interface 41 in this embodiment) to achieve switching during communication. For the operation during reception, when any interface receives the calling, the system switch section 42 transfers data from the interface via the internet protocol processing section 43 to the higher-level processing section, thus starting data communication.

Although the invention has been described with the assumption that remaining battery life is more than 60% for making understanding easy, the operation of the multiservice terminal 140 with decreased battery life will be described in consideration of the actual situation. The battery monitor section 45 regularly monitors remaining battery life and compares it with the thresholds (provided in steps) shown in FIG. 6. When the remaining battery life changes to exceed a certain threshold, the network selecting section 44 acquires an available wireless system list, as in switching of wireless systems during calling or communication, and selects the optimum wireless system from wireless systems that the battery monitor section 45 does not designate to exclude, in the available wireless system list, in accordance with the thresholds shown in FIG. 6, and forces the system to be switched. The selection and switching of the wireless system by the network selecting section 44 are similar to those during communication. Accordingly, when the battery has been worn out, the multiservice terminal 140 can automatically extends available communication time by the operation of the battery monitor section 45. Of course, the function can be stopped selectively with a switch etc., if necessary.

The operation of the multiservice terminal 140 set in the user-designation selection mode will then be described. With the user-designation selection mode, the location manager 49 regularly acquires positional information from the GPS receiver interface 48, wherein when a specified time or a specified distance advances, or when the reception power level of the wireless system selected by its own station drops to create a need for switching (calculated from the data received from the GPS receiver), the location manager 49 sends the positional information to the management server 110, as in the same way as during calling, via the common-signaling wireless network interface 47 (which also serves as positional registration to the management server 110).

The location manager 49 awaits a response from the management server 110 and receives a responded available wireless system list. The location manager 49 transfers the available wireless system list to the display 46 to pop-up display it on the display 46. When a desired wireless system is elected by the user from the displayed available wireless system list, information on the selection is transferred to the network selecting section 44, wherein the network selecting section 44 establishes connection to the desired wireless system, in the same way as switching of the wireless system during calling and communication.

INDUSTRIAL APPLICABILITY

Since the multiservice wireless communication system according to the present invention is constructed as described above, the available-wireless-system-information acquisition section can acquire information on wireless systems available in the position where a multiservice terminal exists. The network selection switching section acquires information such as a reception power level only for the available wireless systems acquired by the available-wireless-system-information acquisition section to automatically select a wireless system that most matches selecting conditions in a short time. When the selecting conditions include the condition that the wireless system is selected only from wireless systems with low power consumption which match the remaining life of a battery mounted to the multiservice terminal, available communication time in the wireless systems with low power consumption can be extended even with a weak battery. Designating a desired wireless system from an available wireless system list displayed on a display allows selection of a wireless system responsive to the demand of a user in a short time.

The invention claimed is:

1. A multiservice wireless communication system comprising: a plurality of wireless systems; a common-signaling wireless network base station in which a plurality of service zones serviced by the wireless systems overlaps in a common-signaling wireless zone; a management server that stores information on respective available wireless systems in positions in the common-signaling wireless zone as database; a network connecting them; and a multiservice terminal serviced therefrom, characterized in that:

the multiservice terminal comprises:

a position detecting section for detecting its own position;

an available-wireless-system-information acquisition section that transmits the position detected by the position detecting section to the management server via the common-signaling wireless network base station and acquires information on available wireless systems in the transmitted position from the management server via the common-signaling wireless network base station; and a network selection switching section for selecting a wireless system that most matches selecting conditions from the available wireless systems acquired by the available-wireless-system-information acquisition section.

2. A multiservice wireless communication system according to claim 1, wherein the wireless-system selecting conditions of the network selection switching section include the condition that the wireless system is selected only from wireless systems with low power consumption which match the remaining life of a battery mounted to the multiservice terminal.

3. A multiservice wireless communication system according to claim 2, wherein the available-wireless-system-information acquisition section displays a list of the acquired available wireless systems on a display for a user to designate a desired wireless system; and the network selection switching section determines as to whether or not the designated wireless system matches the selecting conditions, wherein when the designated wireless system matches the selecting conditions, the wireless system is selected.

4. A multiservice wireless communication system according to claim 1, wherein the available-wireless-system-information acquisition section displays a list of the acquired available wireless systems on a display for a user to designate a desired wireless system; and the network selection switching section determines as to whether or not the designated wireless system matches the selecting conditions, wherein when the designated wireless system matches the selecting conditions, the wireless system is selected.

* * * * *